United States Patent

Itoh

[11] Patent Number: 5,232,244
[45] Date of Patent: Aug. 3, 1993

[54] FRONT WINDSHIELD IMPACT GUARDING DEVICE FOR PASSENGERS IN A VEHICLE

[76] Inventor: Masahiko Itoh, 5-22-6-101, Kamiuma Setagaya-ku, Tokyo, Japan

[21] Appl. No.: 798,808

[22] Filed: Nov. 27, 1991

[30] Foreign Application Priority Data

Nov. 28, 1990 [JP] Japan .................. 2-326390

[51] Int. Cl.⁵ .......................................... B60R 21/08
[52] U.S. Cl. ................... 280/749; 296/97.8; 296/140; 160/370.2 R; 160/275
[58] Field of Search ............. 280/748, 749, 753, 732, 280/730; 296/97.4, 97.8, 140; 160/370.2, 275, 276, DIG. 3; 180/274

[56] References Cited

U.S. PATENT DOCUMENTS

| | | | |
|---|---|---|---|
| 528,071 | 10/1884 | Branshaw | 160/276 |
| 1,186,865 | 6/1916 | Uttz | 280/749 |
| 1,299,986 | 4/1919 | Mattison | 296/97.8 |
| 1,618,022 | 2/1927 | Proctor | 296/140 |
| 1,994,194 | 3/1935 | Fisher | 160/276 |
| 2,180,912 | 11/1939 | Rogers | 280/753 |
| 2,422,863 | 6/1947 | Stroth | 296/97.8 |
| 2,854,281 | 9/1958 | Cassin | 280/749 |
| 3,443,824 | 5/1969 | Dietrich | 280/749 |

FOREIGN PATENT DOCUMENTS 2306881 2/1973 Fed. Rep. of Germany ...... 280/730

Primary Examiner—Karin L. Tyson
Attorney, Agent, or Firm—Donald E. Hewson

[57] ABSTRACT

An impact guarding device includes a shield material in sheet form mounted within the passenger compartment of the vehicle in a manner such that the sheet material can move up and down adjacent the inner surface of the windshield. At least the end of said sheet material which is adjacent a windshield pillar is adapted at its lower end to move in conjunction with a slider, and the slider is adapted to move up and down along a guide rail which is associated with the pillar. The slider is connected to a pull-down mechanism by a tension wire extending therebetween, and the pull-down mechanism has associated therewith a trigger mechanism which is activated upon frontal impact of the vehicle. Thus, upon frontal impact of the vehicle, the trigger mechanism is activated and the shield material is forcibly pulled down. The sheet material may have a handle associated with the lower end thereof, so that the sheet material may be manually pulled downwardly. Moreover, the lower end of the sheet material may have a release mechanism associated with the handle and is connected to a spring loaded protrusion extending from the slider towards the guide rial, which has a plurality of spaced apart holes along its length. Thus, actuation of the release mechanism permits the sheet material to be raised or lowered so that the protrusion will engage with one of the holes in the guide rail.

3 Claims, 4 Drawing Sheets

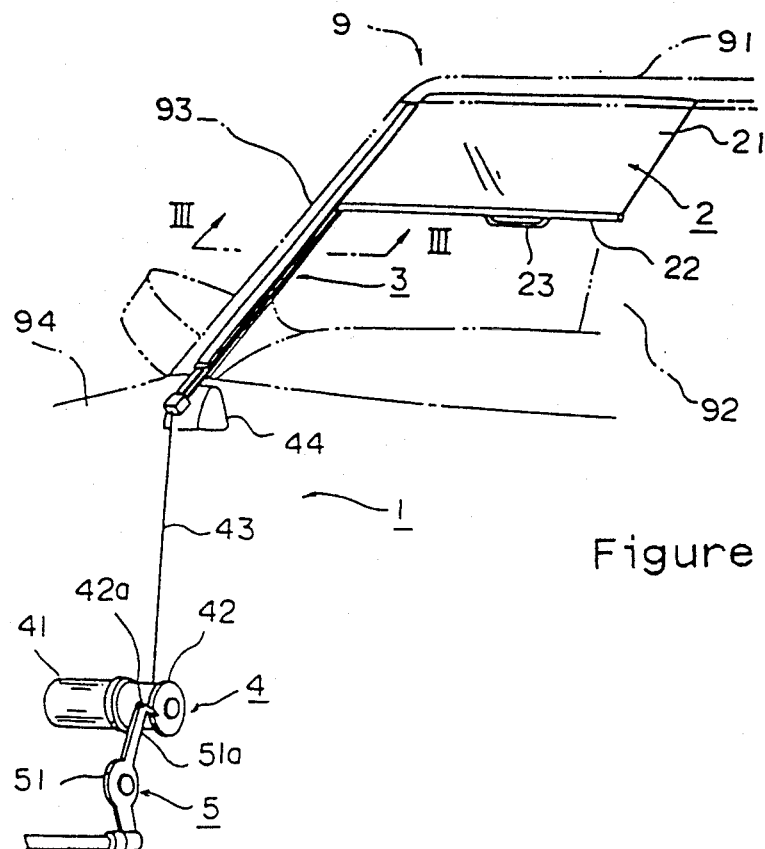
Figure 1
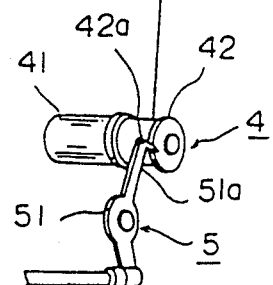
Figure 2
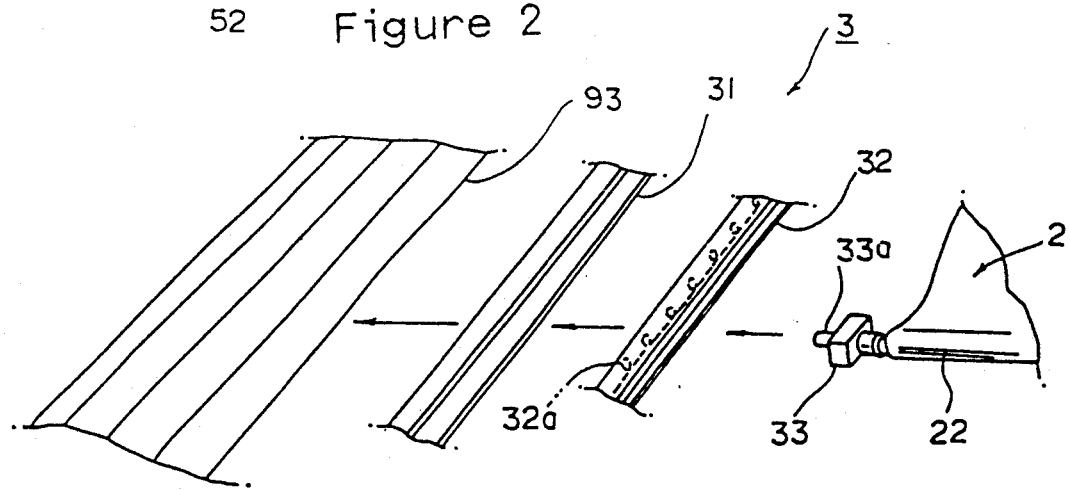

(a)

(b)

FRONT WINDSHIELD IMPACT GUARDING DEVICE FOR PASSENGERS IN A VEHICLE

FIELD OF THE INVENTION

This invention relates to an impact guarding device which prevents direct impact of a passenger into the front windshield of a vehicle, in the event of a frontal impact or other such accidents.

BACKGROUND OF THE INVENTION

It is common that in the event of accidents involving sudden stopping of a vehicle, passengers suffer injuries from their heads colliding with the front windshield.

In order to reduce such injuries, devices such as air bags are being installed in some vehicles. The airbag device serves as an impact absorber by preventing the passenger from impacting his/her head into the front windshield by inflating a bag with pressurized air when the vehicle experiences impact greater than a certain level.

However, with the airbags there was concern that they would lose their effectiveness as an impact guard if punctured by broken glass from the windshield. Furthermore, the working mechanism of the airbag is too complicated, creating problems in assembly, checking and maintenance.

This invention was created with these problem points in mind. The purpose of this invention is to provide an impact guard device which ensures prevention of impact of a passenger into the front windshield, while at the same time, keeping a simple structure.

This invention solves the above issue by providing a front windshield impact guarding device for passengers, which has shield material in sheet form installed along the inner surface of the front windshield. The sheet material is joined to a pull-down mechanism which forcibly pulls the shield material down when activated by a connecting trigger mechanism which responds to frontal impact.

Shield material in sheet form, where at least the lower edge is made of material which blocks sunlight, is installed along the inner surface of the front windshield so that the material can move up and down. In addition a guide rail is installed on the pillars adjacent the abovementioned windshield, and the guide rail has a stopper mechanism to stop the abovementioned shield material at a field position. This guide rail is joined to a pull-down mechanism which forcibly pulls the guide rail down when activated by a connecting trigger mechanism which responds to frontal impact.

In the event of a collision where the vehicle experiences a strong frontal impact, the trigger mechanism activate the pull-down mechanism which immediately pulls down the shield material on the inner surface of the front windshield. Therefore, if a passenger were to hit his/her head, this shield material not only protects and decreases the force of the impact on the head, because it covers the front windshield, it prevents injuries from broken glass.

With the invention in which the shield material is formed with material that blocks out the sun, the shield material can move up and down along the guide rail. Also, by fixing the lower end of the shield material at a set height, it can be used under normal circumstances as a sun visor. In particular, if the entire windshield is covered by the shield material when the vehicle is parked, it can be used as a sun shield to prevent overheating of the interior.

BRIEF DESCRIPTION OF THE DRAWINGS

The present invention will be described with reference to the accompanying drawings, in which:

FIG. 1 is a cross-section of the impact guard device installed on a vehicle;

FIG. 2 is an exploded diagonal view of the guide mechanism;

DESCRIPTION OF THE PREFERRED EMBODIMENTS

Figure 3:
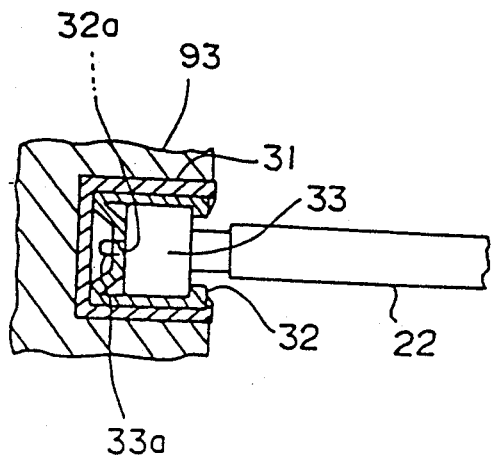
FIG. 3 is a sectional view along line 3—3 in FIG. 1.

An implementation example of the present invention will now be explained with reference to the drawings.

FIG. 1 is a diagonal view of the guard device attached onto a vehicle. This guard device 1 is comprised of a sheet form shield material 2 which is kept in roof 91 of vehicle 9. An affixed guide mechanism 3 is attached onto pillar 93 adjacent to windshield 92, and the pull-down mechanism 4 and trigger mechanism 5 are placed inside the engine compartment 94.

Shield material 2 blocks out the sun and has a flexible elastic character. For example, on the lower end of sheet 21 which may be a plastic board, a hollow rod 22 is affixed horizontally and onto this rod 22 is attached handle 23. Usually when sheet 21 is not in use, it is stored in roof 91 of vehicle 9, and can be lowered along the inner surface of windshield 92 by using handle 23 when needed. Moreover, by installing a spring which attaches onto the side of roof 91 and onto the upper end of shield material 2, it can be structured so that it will supplement the lowering and raising movement of shield material 2.

An exploded analytical diagonal view of the guide mechanism is shown in FIG. 2, while FIG. 3 is a sectional view of the guide mechanism based on line 3—3 of FIG. 1. As these figures indicate, guide mechanism 3 is comprised of slide rail 31 whose cross-section looks like a square letter "C" that is buried into pillar 93, guide rail 32 whose cross-section looks like a square letter "C" that is installed side by side inside the slide rail 31, and slider 43 which can move within the guide rail 32. One end of rod 22 of the aforementioned shield material 2, is attached onto this slider 33.

On guide rail 32, a number of stopper holes 32a are open with fixed spaces in between. The movable stopper protrusion 33a on slider 33 will fit into stopper holes 32a. These form the stopper mechanism which determines the fixed height of the lower end of the shield material.

Figure 4:
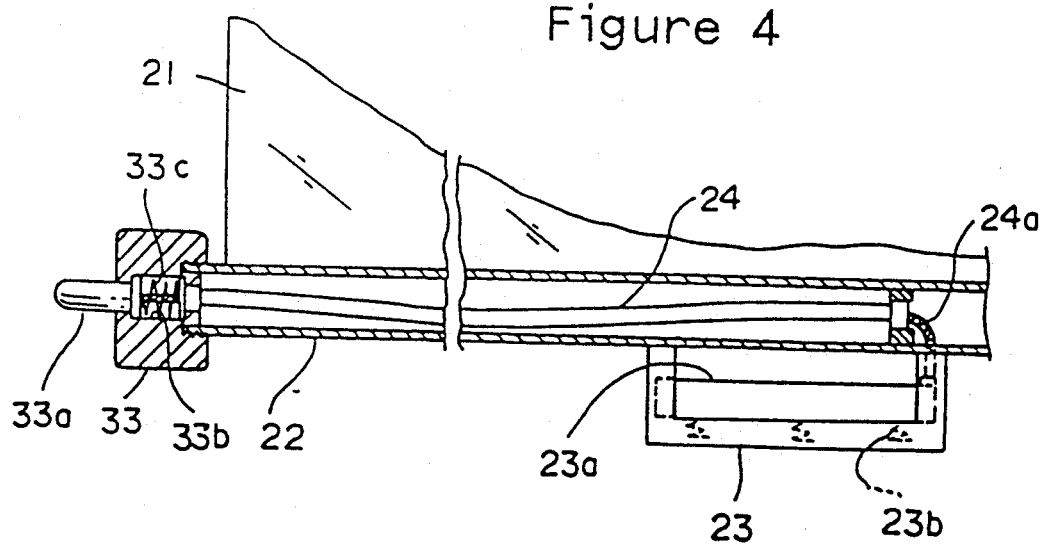
FIG. 4 is an explanatory diagram that indicates the movement of the stopper protrusion.

One example of the structure of the stopper protrusion is explained in FIG. 4. As this figure shows, stopper protrusion 33a is a small cylindrical member and is inserted into hole 33b which is formed on slider 33, and the ends of its inner section is pressed toward the outer section by spring 33c. Lever 23a on handle 23 which is attached onto rod 22 of shield material 2 is attached onto the side of rod 22 by spring 23b. This lever 23a and the aforementioned stopper protrusion 33a are connected by co-axial cable 24. Therefore, by grabbing lever 23a on handle 23, the inner wire 24a of cable 24 is pulled, the stopper protrusion 33a recedes and shield material 2 becomes free to rise and fall. On the other hand, if lever 23a is released, stopper protrusion 33a advances into a stopper hole 32a on guide rail 32, and the shield material 2 will be stopped.

Guide rail 32 is installed in a manner such that it can move in relation to slide rail 31. However, it is stopped securely by a hook, that does not appear in the figure.

The pull-down mechanism 4 is comprised of the power winder 41 which has a strong coil spring in a twisted state affixed to the inner section, the winder drum 42 which is attached, and the tension wire 43 which connects drum 42 with the lower end of aforementioned guide rail 32. Trigger mechanism 5 is comprised of crank 51 which is secured onto the central section of both sides of the vehicle and a moving lever 52 which has been stopped once at the lower end of crank 51 and has positioned the other end on the front part of the vehicle. Under normal conditions, by fitting hook 51a which is formed on the upper end of crank 51 into a notch 42a which is formed on the outer part of winder drum 42a, the winder drum 42 is affixed in a state where it is attached by power winder 41. On the lower end of guide rail 32 is placed slide guide 44. It will bend smoothly towards the set direction when the pull-down mechanism pulls guide rail 32.

Figure 5:
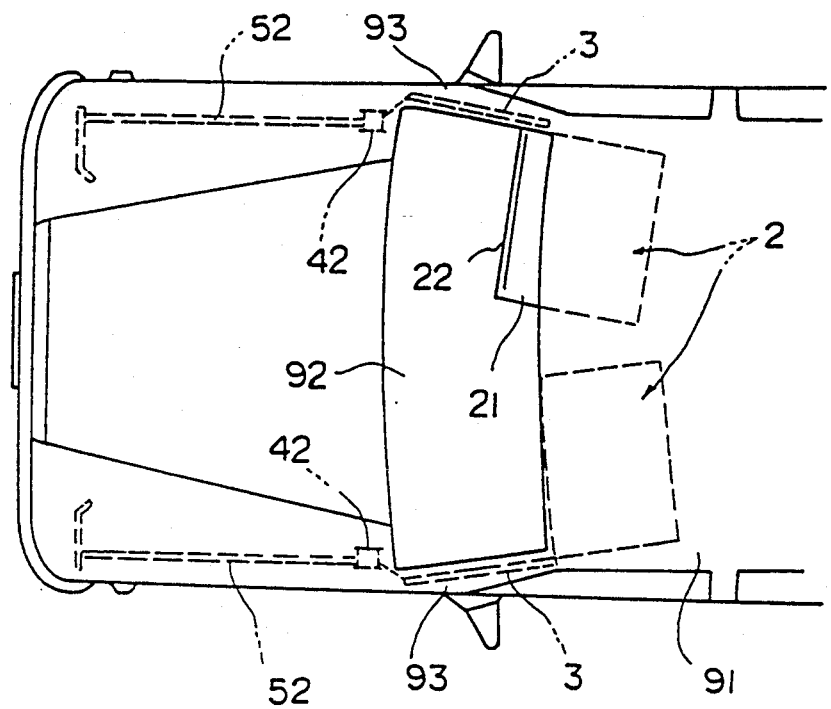
FIG. 5 is an exterior sketch of a vehicle with an impact guard device installed.

FIG. 5 is an exterior diagram of the front section of a vehicle that has the guard device of the present invention installed. The above explanation pertained to the guard device 1 which is installed on the right side (driver's side in Japan) but as the same figure shows, the guard device is installed symmetrically on the left side (passenger's side in Japan) as well.

Figure 6A:
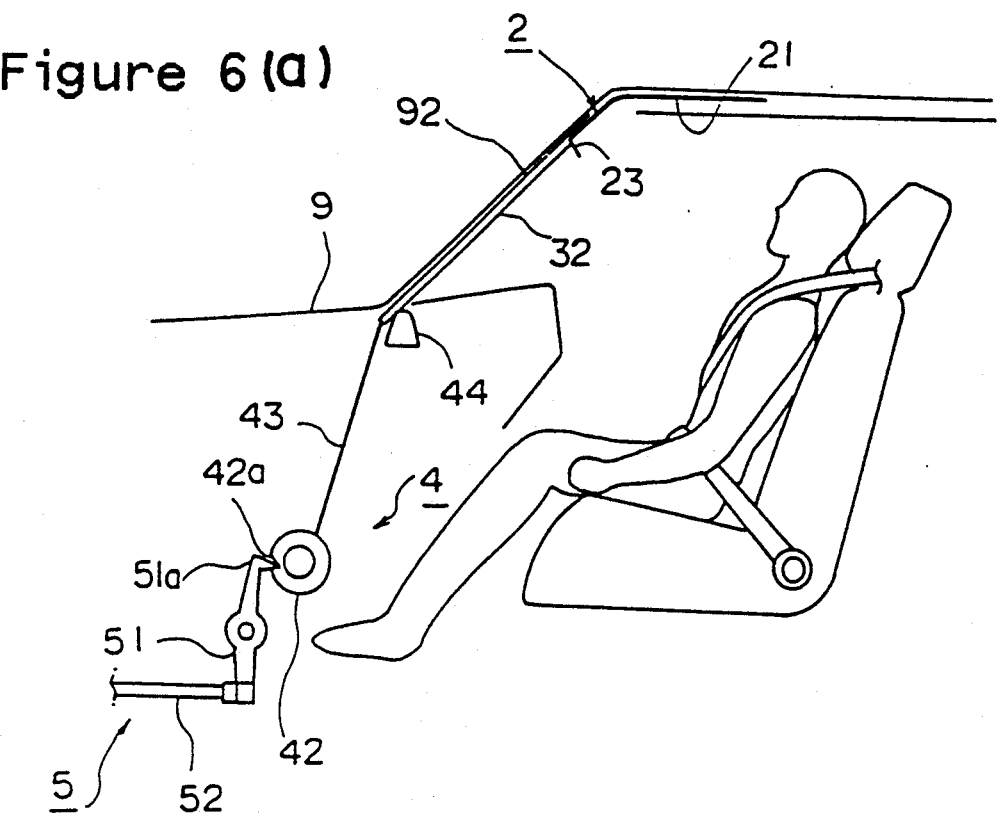
FIGS. 6(a) and 6(b) are explanatory diagrams of the movement of the impact guard device.
Figure 6B:
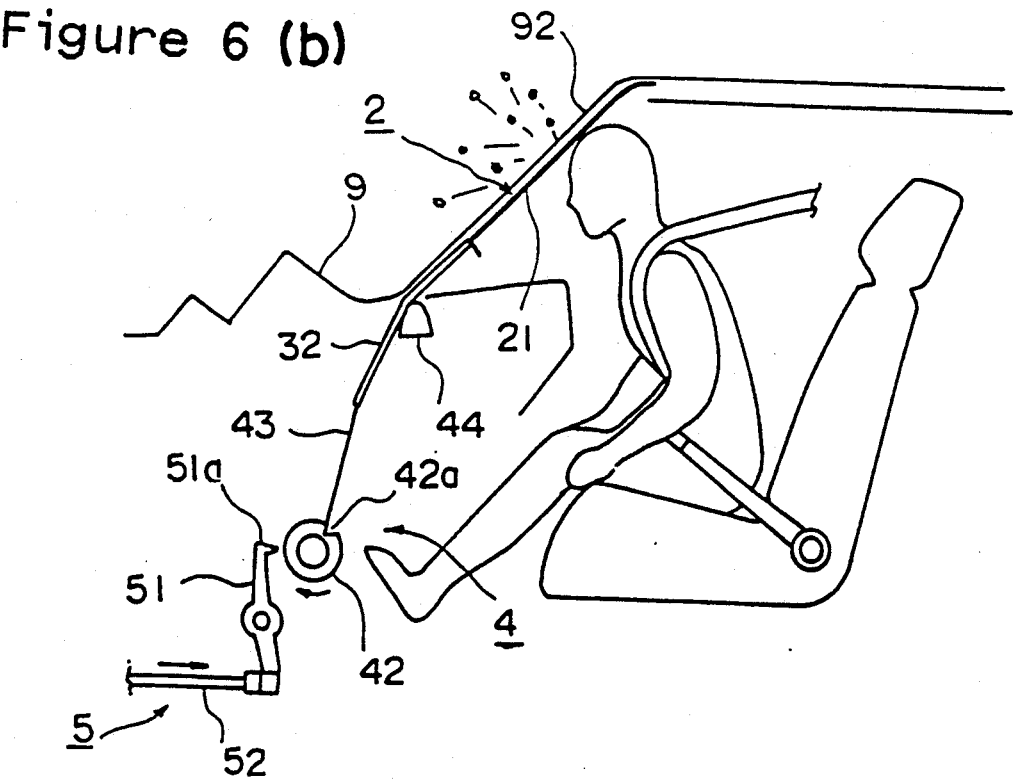

Next, the movement of this implementation example will be explained using FIG. 6. FIG. 6(a) shows the condition of the guide device before operation, while FIG. 6(b) shows the condition of the same device during operation. Both diagrams indicate the condition of the passenger on the left side (passenger seat in Japan) of the vehicle.

As FIG. 6(a) indicates, under normal circumstances, winder drum 42 is locked by crank 51 of trigger mechanism 5. Also, guide rail 32 is at a fixed position and shield material 2 is in a state where it can move up and down along this guide rail 32. In short, by moving the shield material 2 to a fixed height using handle 23 and attaching the lower end of shield material 2 to guide rail 32, this shield material 2 can be used as a sun visor.

Moreover, since this shield material 2 guard device is stored in the roof of the vehicle 9, and the pull-down mechanism 4 and trigger mechanism 5 are placed in the engine compartment 94, installing this device does not decrease the space available within the vehicle.

As FIG. 6(b) indicates, in the case of a collision by the car 9, the impact will apply pressure on the operational lever 52 of trigger mechanism 5 and will rotate crank 51. This will release hook 51a from notch 42a of winder drum 42 and unlock winder drum 42. Winder drum 42 will rotate with power winder 41 and by winding tension wire 43, guide rail 32 and the shield material 2 which is stopped by the guide rail will be pulled down with tremendous power. At this time, slide guide 44 determines the direction towards which the guide rail 32 will be pulled down and pulls it down so that it folds.

In short, if a collision accident occurs, this guard device operates so that the shield material 2 is lowered immediately on the inner surface of the windshield 92 so that when a passenger collides his head it will prevent direct impact with the windshield 92.

As explained above, according to this implementation example, in the event of a collision accident, the shield material 2 covers the windshield 92 thereby decreasing impact to the head as well as preventing injuries from broken glass by preventing the head from going through the windshield 92.

In addition, the guard device 1 of this implementation example can be used under normal circumstances as a sun visor by moving the shield material 2 to a fixed height, allowing it to be used effectively during non-emergency times.

Figure 7:
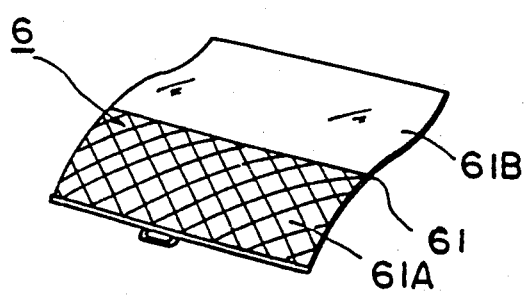
FIGS. 7(a) and 7(b) are explanatory diagrams that indicate other structures of shield materials.
Figure 7:
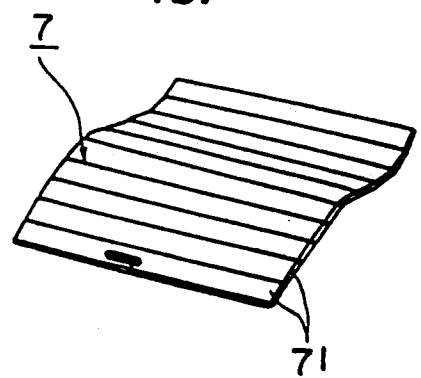

Other examples of shield material forms are shown in FIG. 7. The shield material 6 in FIG. 7(a) is formed using a on-transparent material for the lower section 61A of sheet 61 and a transparent material for the upper section 61B. According to this shield material 6, even if the guard device 1 moved as a result of a malfunction and the shield material 6 fell down, because the upper section 61A is transparent the driver's (or passenger's) view will not be blocked thereby preventing any accidents which may result. When used as a sun visor, since it is the lower section that will be mainly used if the lower section is non-transparent, there is no problem.

Shield material 2 and 6 are conveniently formed using sheet 21 and 61; but as with shield material 7 on FIG. 7(b), it can be formed by connecting a number of long strips of material 71 horizontally.

In addition, if sheet 21 of shield material 2 if formed in the shape of a bag and is structured so that pressurized air is blown into it during operation, the impact absorption effect can be increased even more.

In this implementation example, the power winder 41 on the pull-down mechanism 4 is installed separately, the elasticity of a simpler structure coil spring can be used to pull down the shield 2. Alternatively, the rotation power of the engine can be used as a source of power, in which case a clutch can be installed between the engine output axle and the winder drum as a trigger mechanism.

As explained above, as a result of the invention of this impact guard device, there is no longer concern about the shield losing its effectiveness as a result of a broken windshield, resulting in an effective method of preventing impact of a passenger. At the same time, as a result of the simple structure, it is possible to simplify labour for assembly, checking and maintenance.

As for the invention using the shield material to block the sun, it can be used under normal circumstances as a sun visor or a sun shield, allowing for effective usage other than emergency situations.

What is claimed is:

1. A front windshield impact guarding device for passengers in a vehicle, wherein said impact guarding device comprises a shield material in sheet form mounted within the passenger compartment of the vehicle in a manner such that the sheet material can move up and down adjacent the inner surface of the windshield;
   wherein at least a first edge of said sheet material which i adjacent a windshield pillar has a lower end which is adapted to move in conjunction with a slider, and wherein said slider is adapted to move up and down along a guide rail which is associated with said pillar;

wherein said slider is connected to a pull-down means by tension means extending therebetween; and wherein said pull-down means has associated therewith a trigger mechanism which is activated upon frontal impact of the vehicle;

whereby said trigger mechanism is activated by frontal impact of the vehicle and thereby said shield material is forcibly pulled down by said pull-down mechanism;

wherein said sheet material has a pull-down handle at the lower end thereof, whereby said sheet material may be manually pulled downwardly adjacent the inner surface of said windshield;

wherein said lower end of said sheet material is secured to a hollow rod, and further comprises a release mechanism together with said handle and connected by a tension means extending through said hollow rod to a spring loaded protrusion extending from said slider towards said guide rail; and wherein said guide rail has a plurality of spaced apart holes along its length, each hole being adapted to receive said protrusion;

whereby actuation of said release mechanism withdraws said protrusion from any one of said holes in which it may be placed, and permits said sheet material to be raised or lowered so that its lower end reaches a height where said protrusion will engage with one of said holes in said guide rail.

2. The front windshield impact guarding device of claim 1, wherein at least the lower portion of said sheet material is translucent.

3. The front windshield impact guarding device of claim 1, wherein at least the upper portion of said sheet material is substantially transparent.

* * * * *